US011108603B2

(12) United States Patent
Sanderovich et al.

(10) Patent No.: US 11,108,603 B2
(45) Date of Patent: Aug. 31, 2021

(54) FRAME FORMAT WITH DUAL MODE CHANNEL ESTIMATION FIELD

(71) Applicant: QUALCOMM Incorporated, San Diego, CA (US)

(72) Inventors: Amichai Sanderovich, Atlit (IL); Alecsander Petru Eitan, Haifa (IL); Assaf Yaakov Kasher, Haifa (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/713,690

(22) Filed: Sep. 24, 2017

(65) Prior Publication Data
US 2018/0102927 A1 Apr. 12, 2018

Related U.S. Application Data

(60) Provisional application No. 62/406,270, filed on Oct. 10, 2016.

(51) Int. Cl.
*H04L 27/00* (2006.01)
*H04L 25/02* (2006.01)
(Continued)

(52) U.S. Cl.
CPC ........ *H04L 27/0008* (2013.01); *H04L 5/0092* (2013.01); *H04L 25/022* (2013.01);
(Continued)

(58) Field of Classification Search
None
See application file for complete search history.

(56) References Cited

U.S. PATENT DOCUMENTS 7,738,538 B1 * 6/2010 Tung ................... H04L 27/3872
375/150
7,856,068 B1 * 12/2010 Tung ................... H04L 27/2603
375/267
(Continued)

FOREIGN PATENT DOCUMENTS

CN      101626360      *  1/2010  ............. H04L 27/26
CN      101626360 A         1/2010
(Continued)

OTHER PUBLICATIONS

Cordeiro C., "Specification Framework for TGay", IEEE 802.11-15/1358r5, Aug. 2016 (Cited in the IDS of Jan. 26, 2018) (Year: 2016).*

(Continued)

*Primary Examiner* — Berhanu Tadese
(74) *Attorney, Agent, or Firm* — Patterson + Sheridan, L.L.P.; Kevin M. Donnelly

(57) ABSTRACT

Certain aspects of the present disclosure provide methods and apparatus for generating frames with dual mode channel estimation fields (CEFs) that may accommodate devices with different processing capabilities. In some examples, a frame that is generated comprises a first portion for transmission on separate channels, and a second portion for transmission using channel bonding. The second portion has a training field including first complementary sequences, a first channel estimation field (CEF) including second complementary sequences, and a second CEF including one of the first complementary sequences of the training field and a subset of the second complementary sequences of the first CEF.

15 Claims, 8 Drawing Sheets

(51) Int. Cl.
*H04L 5/00* (2006.01)
*H04L 27/26* (2006.01)
*H04W 48/16* (2009.01)
*H04W 88/06* (2009.01)

(52) U.S. Cl.
CPC ...... *H04L 25/0204* (2013.01); *H04L 25/0226* (2013.01); *H04L 27/2602* (2013.01); *H04L 5/0007* (2013.01); *H04L 27/2601* (2013.01); *H04W 48/16* (2013.01); *H04W 88/06* (2013.01)

(56) References Cited

U.S. PATENT DOCUMENTS

| | | | | |
|---|---|---|---|---|
| 8,019,060 | B2 | 9/2011 | Martino | |
| 8,165,185 | B2* | 4/2012 | Zhang | H04L 27/2613 375/135 |
| 8,175,118 | B2* | 5/2012 | Zhang | H04L 27/262 370/474 |
| 8,332,732 | B2* | 12/2012 | Lakkis | H04J 13/0014 714/783 |
| 8,429,502 | B2* | 4/2013 | Lakkis | H03M 13/1505 714/775 |
| 8,477,813 | B2* | 7/2013 | Zhang | H04L 27/2613 370/510 |
| 8,599,900 | B2* | 12/2013 | Zhang | H04L 27/2613 375/135 |
| 8,774,251 | B2* | 7/2014 | Zhang | H04L 69/22 375/135 |
| 8,867,569 | B2* | 10/2014 | Zhang | H04W 16/28 370/476 |
| 8,891,592 | B1* | 11/2014 | Zhang | H04L 7/0091 375/149 |
| 8,929,397 | B2* | 1/2015 | Zhang | H04B 1/707 370/474 |
| 9,525,759 | B2* | 12/2016 | Zhang | H04J 13/102 |
| 9,668,169 | B2* | 5/2017 | Jafarian | H04L 47/29 |
| 9,794,879 | B1* | 10/2017 | Yang | H04W 52/0219 |
| 9,825,782 | B2* | 11/2017 | Eitan | H04L 25/0204 |
| 9,918,329 | B2* | 3/2018 | Cariou | H04W 72/12 |
| 9,949,259 | B2* | 4/2018 | Eitan | H04L 1/0079 |
| 9,985,740 | B2* | 5/2018 | Cordeiro | H04L 1/0003 |
| 10,021,695 | B2* | 7/2018 | Eitan | H04L 1/009 |
| 10,044,635 | B2* | 8/2018 | Eitan | H04L 27/2602 |
| 10,187,497 | B1* | 1/2019 | Sun | H04L 69/22 |
| 10,244,531 | B2* | 3/2019 | Eitan | H04L 5/001 |
| 10,333,669 | B2* | 6/2019 | Eitan | H04L 27/265 |
| 10,355,896 | B2* | 7/2019 | Lomayev | H04L 27/2601 |
| 10,587,442 | B2* | 3/2020 | Lomayev | H04B 7/0452 |
| 10,602,510 | B2* | 3/2020 | Park | H04L 5/0048 |
| 10,616,775 | B2* | 4/2020 | Kim | H04B 7/0695 |
| 10,727,994 | B2* | 7/2020 | Sanderovich | H04B 17/354 |
| 2007/0168841 | A1* | 7/2007 | Lakkis | H04J 13/0014 714/781 |
| 2008/0298435 | A1* | 12/2008 | Lakkis | H04J 13/0014 375/140 |
| 2010/0054223 | A1* | 3/2010 | Zhang | H04W 16/28 370/338 |
| 2010/0080266 | A1* | 4/2010 | Zhang | H04J 13/102 375/140 |
| 2010/0111229 | A1* | 5/2010 | Kasher | H04L 27/2601 375/308 |
| 2010/0329366 | A1* | 12/2010 | Wang | H04L 5/0042 375/259 |
| 2012/0201276 | A1* | 8/2012 | Zhang | H04L 5/0048 375/135 |
| 2012/0207192 | A1* | 8/2012 | Zhang | H04J 13/102 375/135 |
| 2012/0207232 | A1* | 8/2012 | Zhang | H04L 27/2603 375/260 |
| 2012/0219017 | A1* | 8/2012 | Zhang | H04B 1/707 370/474 |
| 2013/0223498 | A1* | 8/2013 | Sanderovich | H04L 25/0224 375/225 |
| 2013/0242968 | A1* | 9/2013 | Zhang | H04L 25/03343 370/338 |
| 2014/0321479 | A1* | 10/2014 | Zhang | H04L 69/22 370/474 |
| 2015/0156036 | A1* | 6/2015 | Genossar | H04L 25/0202 375/232 |
| 2015/0365195 | A1* | 12/2015 | Yang | H03M 13/271 375/295 |
| 2016/0020933 | A1* | 1/2016 | Rajagopal | H04L 27/0006 370/329 |
| 2016/0164800 | A1* | 6/2016 | Eitan | H04L 25/0204 370/389 |
| 2016/0308594 | A1* | 10/2016 | Sanderovich | H04B 7/0613 |
| 2016/0309457 | A1* | 10/2016 | Eitan | H04L 1/0083 |
| 2016/0330738 | A1* | 11/2016 | Eitan | H04L 27/2602 |
| 2017/0033949 | A1* | 2/2017 | Eitan | H04L 25/0204 |
| 2017/0033958 | A1* | 2/2017 | Eitan | H04L 27/2603 |
| 2017/0070995 | A1* | 3/2017 | Eitan | H04L 27/2602 |
| 2017/0078008 | A1* | 3/2017 | Kasher | H04L 69/22 |
| 2017/0111099 | A1* | 4/2017 | Jo | H04B 7/063 |
| 2017/0111143 | A1* | 4/2017 | Seok | H04L 1/0091 |
| 2017/0126303 | A1* | 5/2017 | Jo | H04B 7/0621 |
| 2017/0134126 | A1* | 5/2017 | Sanderovich | H04L 1/0071 |
| 2017/0134928 | A1* | 5/2017 | Eitan | H04L 25/03343 |
| 2017/0187435 | A1* | 6/2017 | Cariou | H04W 74/0816 |
| 2017/0201298 | A1* | 7/2017 | Cariou | H04W 72/0446 |
| 2017/0201992 | A1* | 7/2017 | Cordeiro | H04W 40/244 |
| 2017/0207905 | A1* | 7/2017 | Eitan | H04L 5/0055 |
| 2017/0208154 | A1* | 7/2017 | Park | H04L 1/0083 |
| 2017/0257189 | A1* | 9/2017 | Jiang | H04L 1/1635 |
| 2017/0257201 | A1* | 9/2017 | Eitan | H04W 52/52 |
| 2017/0264350 | A1* | 9/2017 | Sanderovich | H04B 7/0632 |
| 2017/0265224 | A1* | 9/2017 | Sanderovich | H04B 7/0805 |
| 2017/0295595 | A1* | 10/2017 | Yang | H04W 74/0816 |
| 2017/0302349 | A1* | 10/2017 | Sun | H04B 7/0695 |
| 2017/0302402 | A1* | 10/2017 | Cordeiro | H04L 1/0025 |
| 2017/0324453 | A1* | 11/2017 | Lomayev | H04B 7/0634 |
| 2017/0324461 | A1* | 11/2017 | Lomayev | H04L 27/2603 |
| 2017/0324599 | A1* | 11/2017 | Lomayev | H04B 7/0413 |
| 2018/0006866 | A1* | 1/2018 | Trainin | H04W 74/002 |
| 2018/0020374 | A1* | 1/2018 | Kasher | H04L 5/0023 |
| 2018/0062902 | A1* | 3/2018 | Gagiev | H04L 27/2605 |
| 2018/0062903 | A1* | 3/2018 | Kasher | H04L 27/2602 |
| 2018/0076979 | A1* | 3/2018 | Lomayev | H04L 25/0226 |
| 2018/0092092 | A1* | 3/2018 | Cariou | H04L 1/0009 |
| 2018/0102927 | A1* | 4/2018 | Sanderovich | H04L 25/0204 |
| 2018/0191419 | A1* | 7/2018 | Eitan | H04B 7/0617 |
| 2018/0198584 | A1* | 7/2018 | Sanderovich | H04B 17/336 |
| 2018/0255537 | A1* | 9/2018 | Park | H04L 5/001 |
| 2018/0262366 | A1* | 9/2018 | Sahin | H04L 25/0204 |
| 2018/0288759 | A1* | 10/2018 | Eitan | H04L 1/0079 |
| 2018/0367650 | A1* | 12/2018 | Motozuka | H04L 29/06 |
| 2019/0068258 | A1* | 2/2019 | Oteri | H04B 7/0617 |
| 2019/0074873 | A1* | 3/2019 | Liu | H04B 7/0417 |
| 2019/0123798 | A1* | 4/2019 | Lou | H04B 7/0486 |
| 2019/0140730 | A1* | 5/2019 | Oteri | H04B 7/0417 |
| 2019/0182089 | A1* | 6/2019 | Yun | H04L 27/2602 |
| 2019/0190637 | A1* | 6/2019 | Lomayev | H04L 23/02 |
| 2019/0190754 | A1* | 6/2019 | Kim | H04L 1/0625 |
| 2019/0200388 | A1* | 6/2019 | Park | H04W 72/04 |
| 2019/0208463 | A1* | 7/2019 | Lou | H04W 48/12 |
| 2019/0215702 | A1* | 7/2019 | Yun | H04L 27/2607 |
| 2019/0260446 | A1* | 8/2019 | Oteri | H04B 7/0695 |
| 2019/0288763 | A1* | 9/2019 | Oteri | H04B 7/0636 |
| 2019/0349782 | A1* | 11/2019 | Kim | H04W 16/28 |
| 2020/0059287 | A1* | 2/2020 | Kim | H04L 5/00 |
| 2020/0067577 | A1* | 2/2020 | Lou | H04W 74/002 |
| 2020/0084079 | A1* | 3/2020 | Kim | H04L 27/26 |
| 2020/0128524 | A1* | 4/2020 | Han | H04B 7/0695 |
| 2020/0162135 | A1* | 5/2020 | Sun | H04B 17/318 |

(56) References Cited

U.S. PATENT DOCUMENTS

2020/0205014 A1\* 6/2020 Kim .................... H04W 74/006
2020/0228141 A1\* 7/2020 Lomayev .............. H04L 1/0057

FOREIGN PATENT DOCUMENTS

| CN | 102165726 A | | 8/2011 | |
| --- | --- | --- | --- | --- |
| CN | 102165726 | \* | 8/2014 | ............. H04L 69/22 |
| WO | WO 2009140605 A1 | \* | 11/2009 | .......... H04J 13/0014 |
| WO | WO-2009140605 A1 | \* | 11/2009 | .......... H04J 13/0014 |
| WO | WO-2018017977 A1 | \* | 1/2018 | ........... H04B 7/0619 |
| WO | WO-2018071165 A1 | \* | 4/2018 | .......... H04L 25/022 |

OTHER PUBLICATIONS

CN101626360 (Machine Translated by STIC's Foreign Patent Services Center (FPSC), Jun. 17, 2021).\*

Cordeiro C., (INTEL): "Specification Framework for TGay; 11-15-1358-05-00ay-specification-framework-for-tgay", IEEE Draft; IEEE-SA Mentor, Piscataway, NJ, USA, vol. 802.11ay, No. 5, Aug. 17, 2016, pp. 1-26, XP068107003, Retrieved from the Internet: URL: https://mentor.ieee.org/802.11/dcn/15/11-15-1358-05-00ay-specification-framework-for-tgay.doc [retrieved on Aug. 17, 2016].

International Search Report and Written Opinion—PCT/US2017/053295—ISA/EPO—dated Nov. 29, 2017.

\* cited by examiner

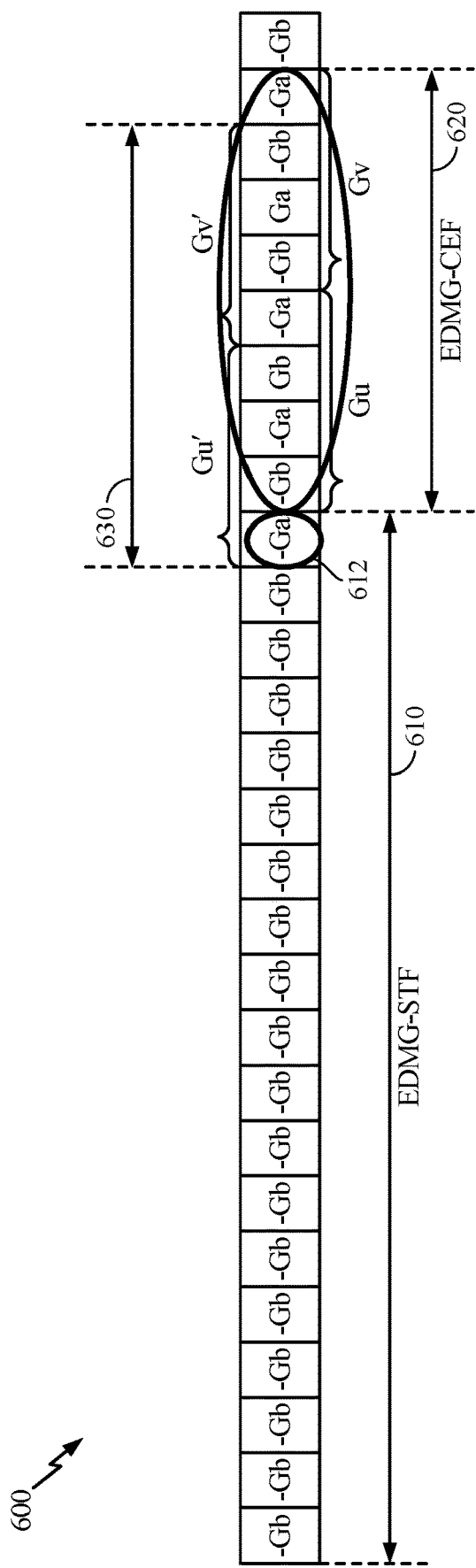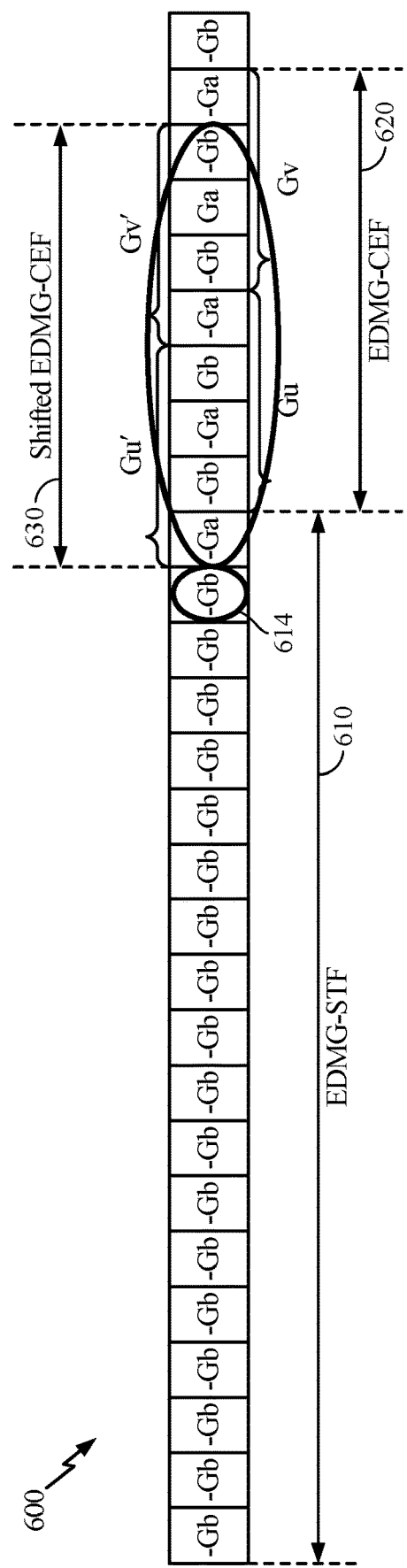
FIG. 7A
FIG. 7B

FRAME FORMAT WITH DUAL MODE CHANNEL ESTIMATION FIELD

CLAIM OF PRIORITY UNDER 35 U.S.C. § 119

This application claims priority to and the benefit of U.S. Provisional Application Ser. No. 62/406,270, entitled "Frame Format with Dual Mode Channel Estimation Field," filed Oct. 10, 2016, which application is incorporated by reference herein in its entirety.

FIELD

Certain aspects of the present disclosure generally relate to wireless communications and, more particularly, to generating frames with "dual mode" channel estimation fields that may accommodate different types of devices (e.g., with different processing capabilities).

BACKGROUND

In order to address the issue of increasing bandwidth requirements demanded for wireless communications systems, different schemes are being developed to allow multiple user terminals to communicate with a single access point by sharing the channel resources while achieving high data throughputs. Multiple-input multiple-output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide an apparatus for wireless communications. The apparatus generally includes a processing system configured to generate a frame comprising a first portion for transmission on separate channels and a second portion for transmission using channel bonding, the second portion having a training field formed by complementary sequences, a first channel estimation field (CEF) formed by complementary sequences, and a second CEF formed by a last complementary sequence of the training field and starting complementary sequences of the first CEF, and an interface configured to output the frame for transmission.

Certain aspects of the present disclosure provide an apparatus for wireless communications. The apparatus generally includes an interface and a processing system. The interface is generally configured to obtain a frame, wherein a first portion of the frame is obtained on separate channels, a second portion of the frame is obtained using channel bonding, and the second portion has a training field including first complementary sequences, a first channel estimation field (CEF) including second complementary sequences, and a second CEF including one of the first complementary sequences of the training field and a subset of the second complementary sequences of the first CEF. The processing system is generally configured to perform channel estimation based on at least one of the first CEF or the second CEF.

Aspects of the present disclosure also provide various methods, means, and computer program products corresponding to the apparatuses and operations described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 7A and 7B illustrate how the example dual mode channel estimation field (CEF) of FIG. 6 may be used, in accordance with certain aspects of the present disclosure.

DETAILED DESCRIPTION

Figure 1:
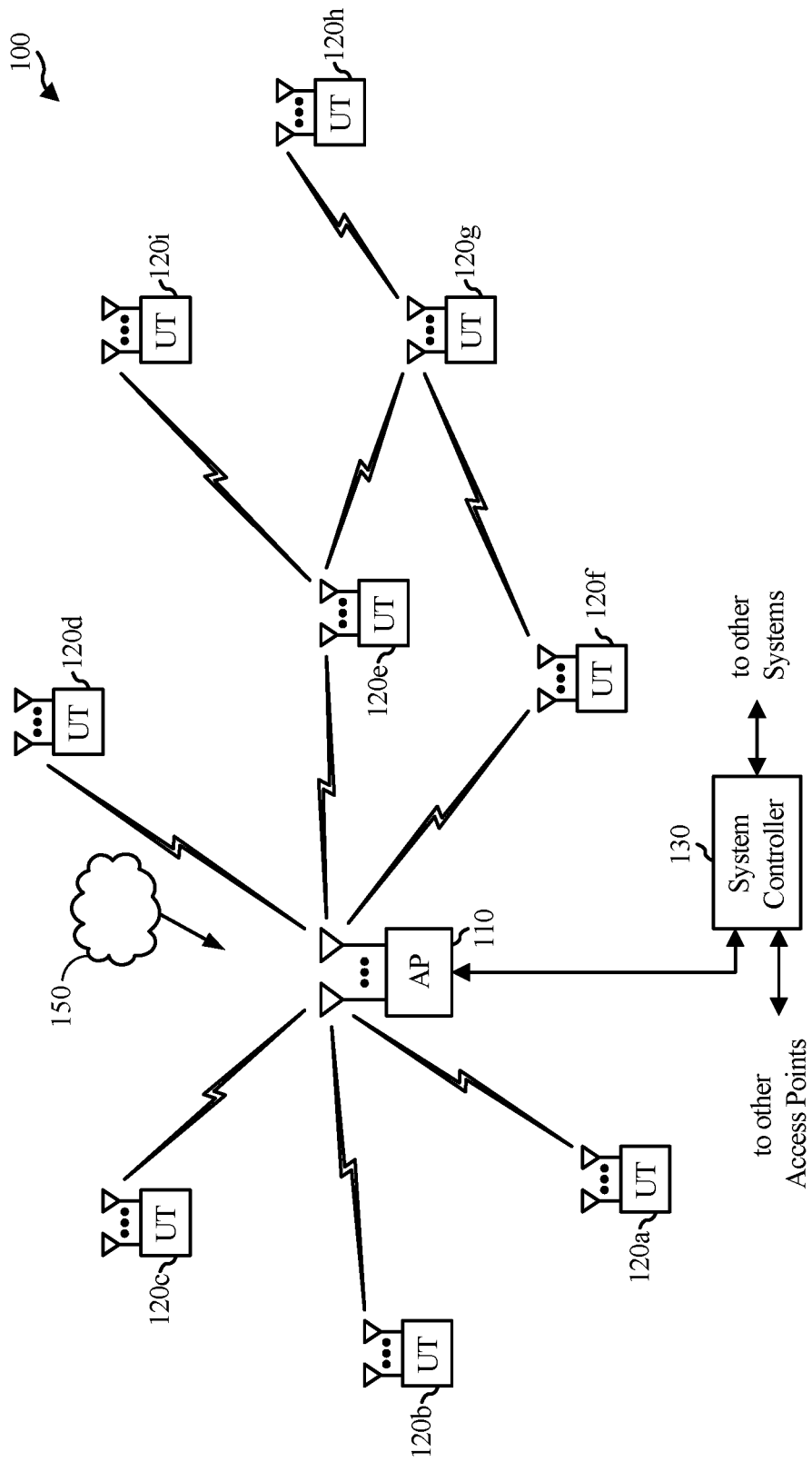
FIG. 1 is a diagram of an example wireless communications network, in accordance with certain aspects of the present disclosure.

Certain aspects of the present disclosure provide methods and apparatus for generating frame formats with GI sequences of different lengths.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA) systems, Time Division Multiple Access (TDMA) systems, Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to a different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
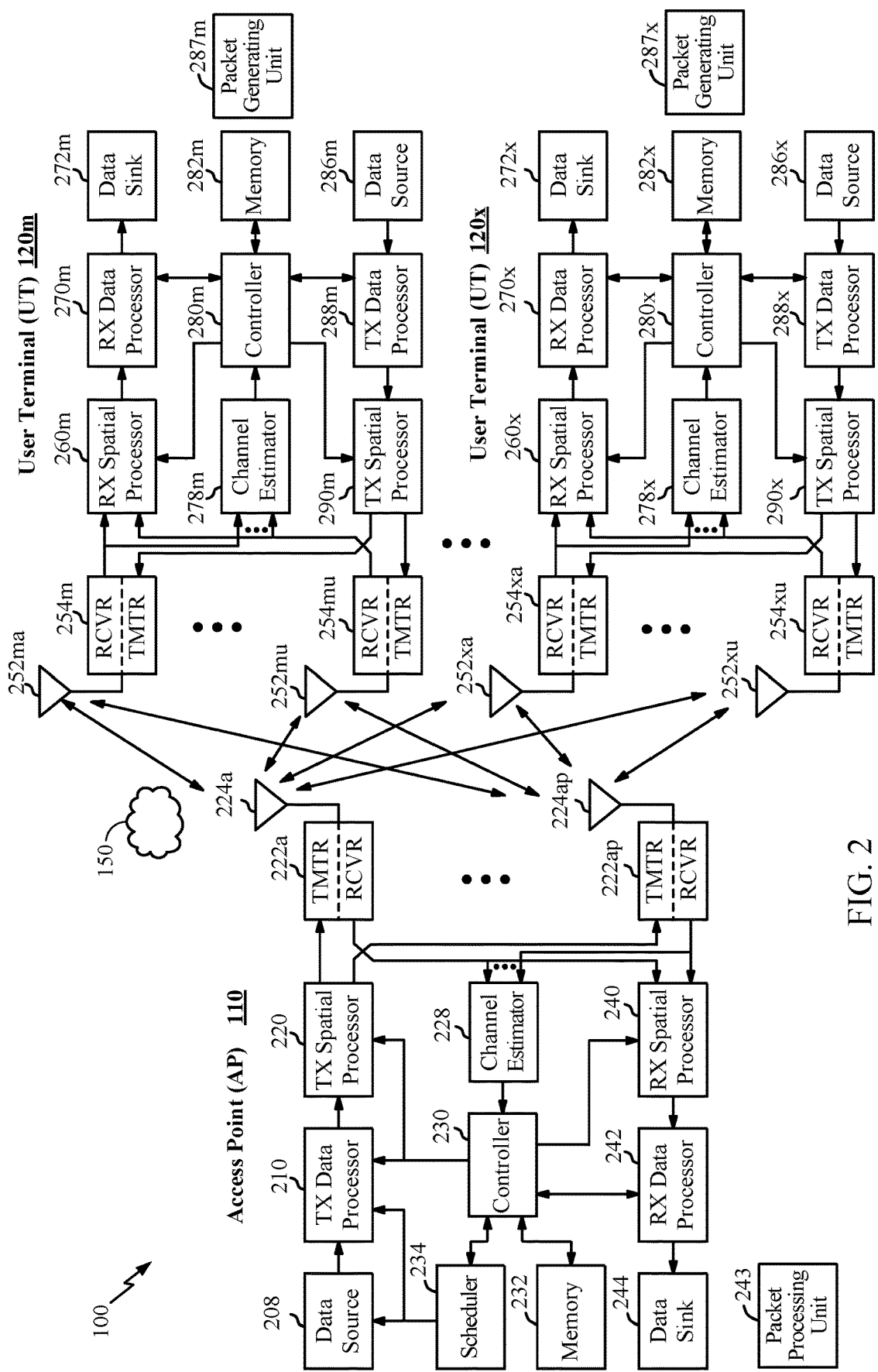
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) of transceivers 254 receives and processes (e.g., converts to analog, amplifies, filters, and frequency upconverts) a respective transmit symbol stream to generate an uplink signal. $N_{ut,m}$ transmitter units of transceivers 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) of transceivers 222. Each receiver unit of transceivers 222 performs processing complementary to that performed by transmitter unit of transceiver 254 and provides a received symbol stream. An RX spatial processor 240 performs receiver spatial processing on the $N_{ap}$ received symbol streams from $N_{ap}$ receiver units of transceivers 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming) on the Ndn downlink data symbol streams, and provides $N_{ap}$ transmit symbol streams for the $N_{ap}$ antennas. Each transmitter unit of transceivers 222 receives and processes a respective transmit symbol stream to generate a downlink signal. $N_{ap}$ transmitter units of transceivers 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit of transceivers 254 processes a received signal from an associated antenna 252 and provides a received symbol stream. An RX spatial processor 260 performs receiver spatial processing on $N_{ut,m}$ received symbol streams from $N_{ut,m}$ receiver units of transceivers 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

As illustrated, in FIGS. 1 and 2, one or more user terminals 120 may send one or more High Efficiency WLAN (HEW) packets 150, with a preamble format as described herein (e.g., in accordance with an example format shown in FIG. 3), to the access point 110 as part of a UL MU-MIMO transmission, for example. Each HEW packet 150 may be transmitted on a set of one or more spatial streams (e.g., up to 4). For certain aspects, the preamble portion of the HEW packet 150 may include tone-interleaved LTFs, subband-based LTFs, or hybrid LTFs.

The HEW packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the HEW packet 150 may be processed (e.g., decoded and interpreted) by a packet processing unit 243 at the access point 110. The packet processing unit 243 may be implemented in the processing system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a HEW packet 150 based on the IEEE 802.11 HEW standard, but may interpret a legacy packet (e.g., a packet complying with IEEE 802.11a/b/g) in a different manner, according to the standards amendment associated therewith.

Certain standards, such as the IEEE 802.11ay standard currently in the development phase, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

Example Frame Format with Dual Mode Channel Estimation Field

A new standard 11ay for 60 GHz communication is under development in the 802.11 working group under task group TGay. This is an enhancement of the existing 802.11TGad (DMG-Directional Multi-Gigabit) standard and, thus, may be referred to as E-DMG. This standard increases the PHY throughput in 60 GHz by using methods such as MIMO and channel bonding/channel aggregation.

One of the modes of the new standard is the SISO single carrier (SC) operating mode. This mode is very similar to the legacy 802.11ad SC mode. The differences in this mode from the legacy 802.11ad mode may be the addition of high non uniform constellations, different length LDPC code and the addition of short and long GI (Guard Interval).

Figure 3:
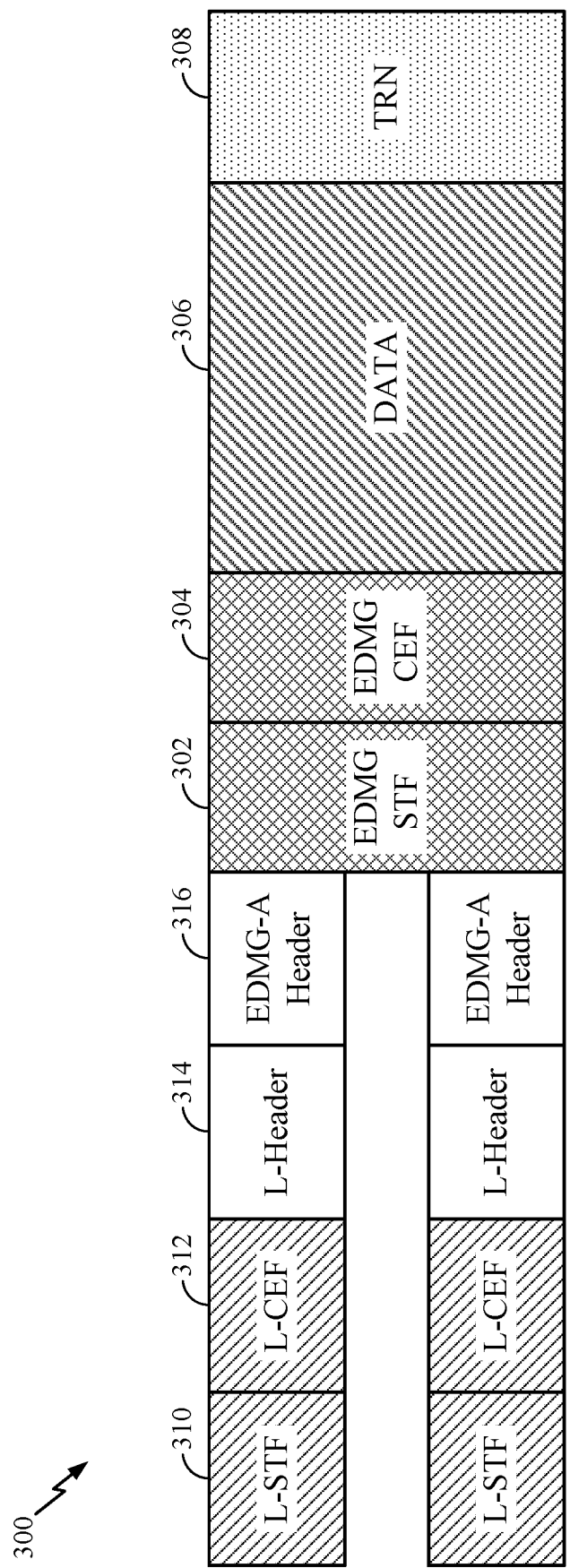
FIG. 3 illustrates an example frame format which may have dual mode channel estimation fields (CEFs), in accordance with certain aspects of the present disclosure.

FIG. 3 illustrates an example frame format 300 (e.g., for SISO SC operating mode) with a legacy portion (K-STF, L-CEF, L-Headers, decodable by legacy devices) and EDMG portions (Header A1/A2) that may be transmitted in separate wireless channels.

As illustrated, the frame may also include another (wideband) portion transmitted using channel bonding (e.g., bonding 2 or more channels), with a short training field (EDMG-STF) channel estimation field (CEF), which may be followed by data payload. For the WB signal, starting with the EDMG STF, the time domain processing may be different from that of the legacy compatible signal (L-STF to the EDMG-A header), due to different bandwidth, different filtering, and different block sizes.

Aspects of the present disclosure provide frame formats with sequence designs for a "dual mode" channel estimation field (CEF) that may accommodate devices with different processing capabilities. For example, the dual mode CEF may accommodate devices that could use additional processing time after (the last Golay sequence of) the CEF, as well as other devices that could use additional processing time during the STF time (before CEF).

Figure 4:
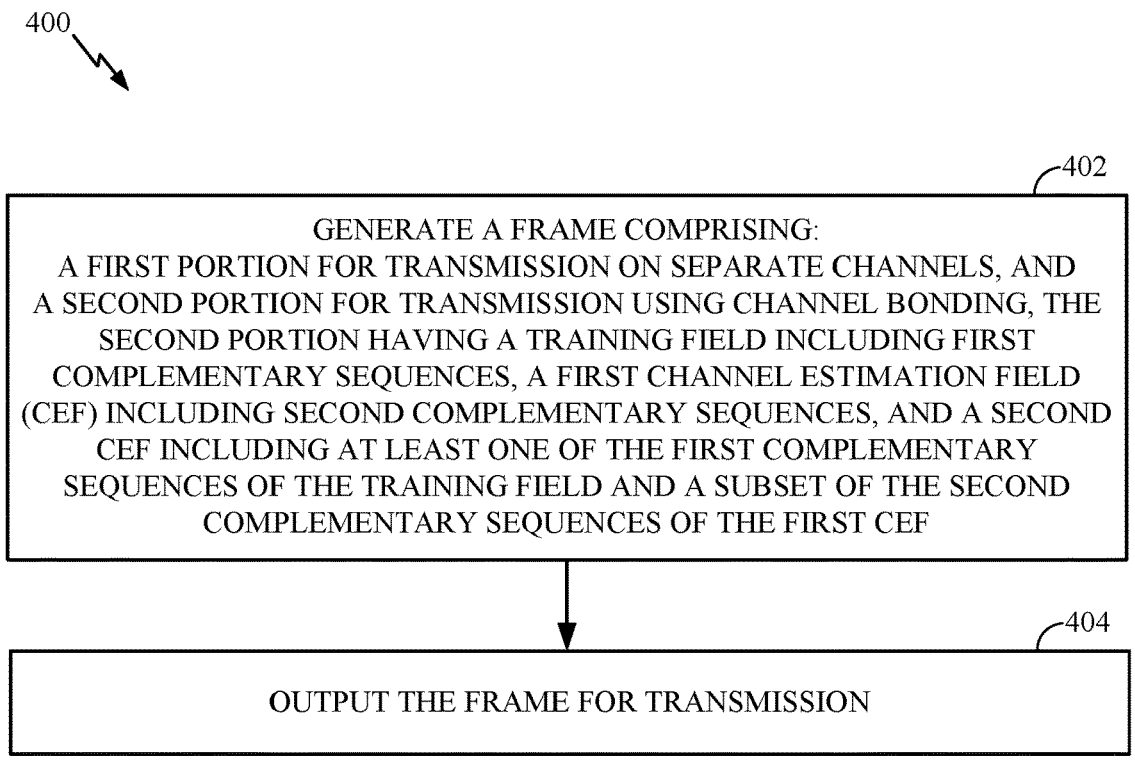
FIG. 4 illustrates example operations for generating a frame with different length GIs, in accordance with certain aspects of the present disclosure.

FIG. 4 illustrates example operations 400 for generating a frame with a dual mode CEF, in accordance with certain aspects of the present disclosure. Operations 400 may be performed, for example, by an access point or non-access point station.

The operations 400 begin, at 402, by generating a frame comprising: a first portion for transmission on separate channels, and a second portion for transmission using channel bonding, the second portion having a training field including first complementary sequences, a first channel estimation field (CEF) including second complementary sequences, and a second CEF including a last of the first complementary sequences of the training field and a subset of the second complementary sequences of the first CEF. At 404, the frame is output for transmission.

Figure 5:
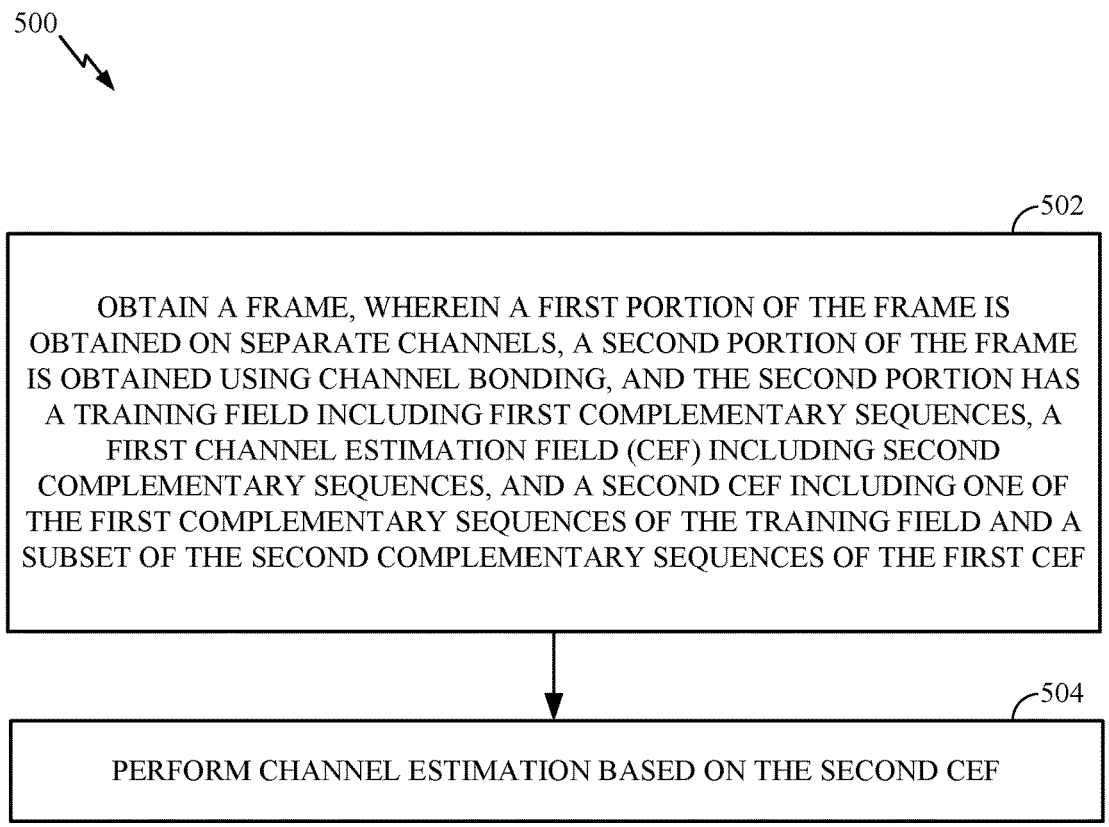
FIG. 5 illustrates example operations for generating a frame with different length GIs, in accordance with certain aspects of the present disclosure.

FIG. 5 illustrates example operations 500 for processing a frame with a dual mode CEF, in accordance with certain aspects of the present disclosure. Operations 500 may be performed, for example, by a station to process a frame generated in accordance with operations 400 described above.

The operations 500 begin, at 502, by obtaining a frame, wherein a first portion of the frame is obtained on separate channels, a second portion of the frame is obtained using channel bonding, and the second portion has a training field including first complementary sequences, a first channel estimation field (CEF) including second complementary sequences, and a second CEF including one of the first complementary sequences of the training field and a subset of the second complementary sequences of the first CEF. At 504, the station performs channel estimation based on the second CEF.

Figure 6:
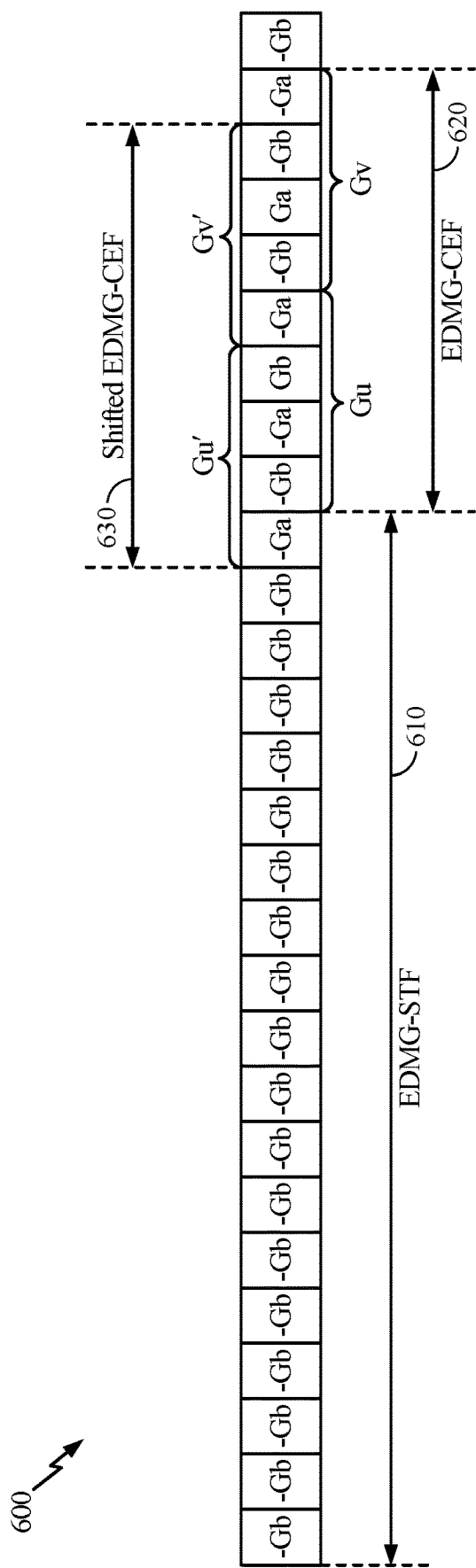
FIG. 6 illustrates an example dual mode channel estimation field (CEF), in accordance with certain aspects of the present disclosure.

As illustrated in FIG. 6, in some cases, a (SC) wideband preamble portion 600 with a dual mode CEF may be enabled by repeating a first complementary sequence (e.g., −Gb) in the EDMG-STF 610 that ends with a second complementary sequence (e.g., −Ga). With this design, a receiving device may perform channel estimation based on the EDMG-CEF 620 [Gu,Gv] or on a shifted EDMG-CEF 630 [Gu',Gv'] where Gu'=[−Ga,Gu(1−the last−Ga)] and Gv'=[−Ga,Gv(−the last−Ga)].

This approach allows different types of devices to perform channel estimation according to different timing. For example, as illustrated in FIG. 7A, devices that could use additional processing time before CEF can perform channel estimation based on EDMG-CEF 620. As illustrated in FIG. 7B, devices that could use additional processing time after CEF could perform channel estimation based on the shifted EDMG-CEF 630.

In this manner, a receiving device may use either the EDMG-CEF 620 or the shifted EDMG-CEF 630, for example, depending on its processing capabilities. In some cases, a receiving device may decide which CEF to use (shifted or non-shifted), for example, based on one or more conditions (e.g., available processing resources, latency requirements, and the like).

As illustrated, the last Golay sequence (−Ga) 612 of the EDMG-STF 610 provides for a cyclic pattern for EDMG-CEF 620, while the second to last Golay sequence (−Gb) 614 of the EDMG-STF 610 provides for a cyclic pattern for shifted EDMG-CEF 630 (e.g., with −Ga 612 and −Gb 614 essentially forming cyclic prefixes for EDMG-CEF 620 and shifted EDMG-CEF 630, respectively).

Figure 8:
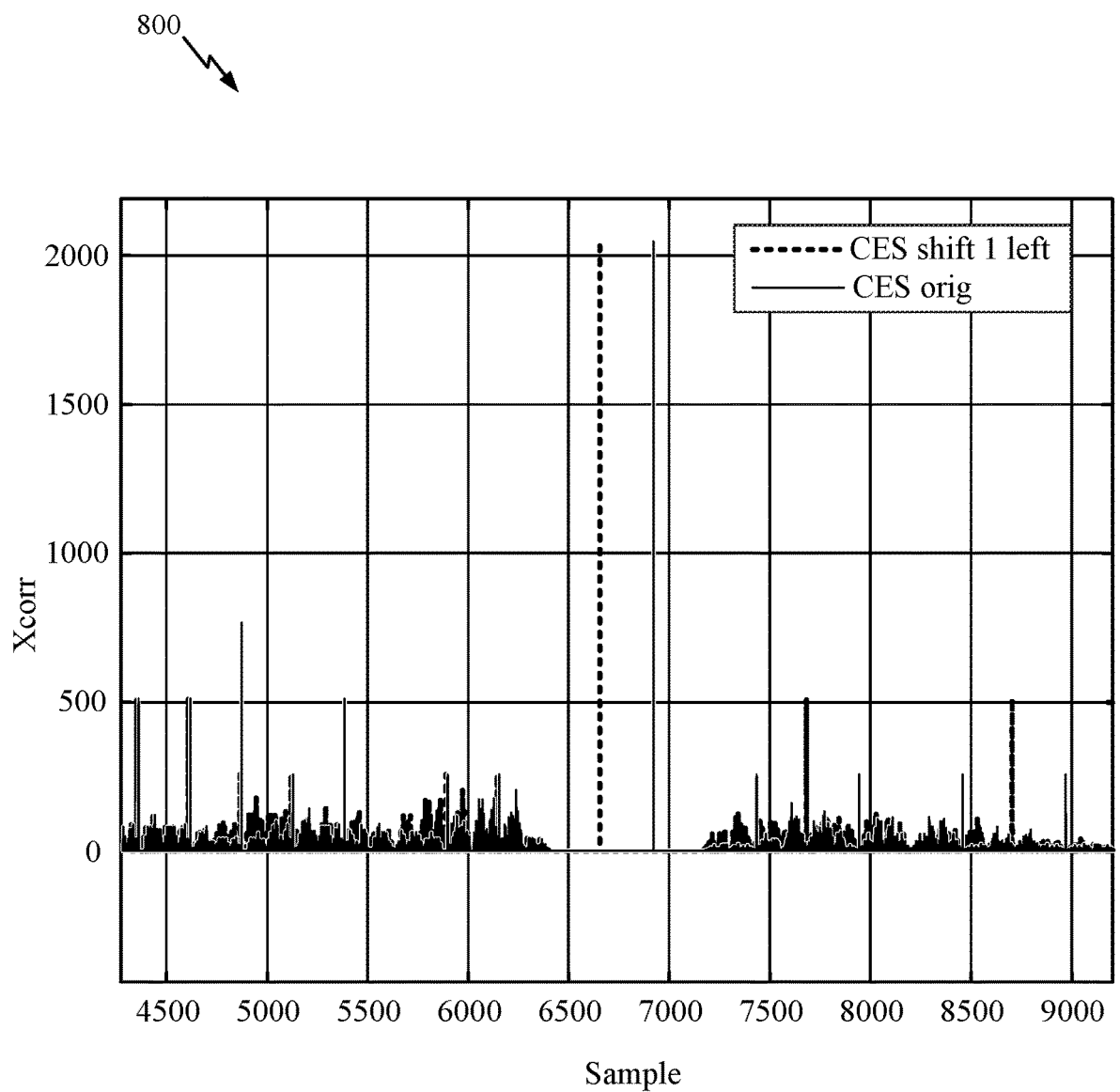
FIG. 8 illustrates example correlation performance that may be achievable with the example dual mode channel estimation field (CEF) of FIG. 6.

FIG. 8 illustrates how correlation performance using the shifted EDMG-CEF 630 may be similar to the original (non-shifted) EDMG-CEF 620.

In some cases, lengths (number of samples) of the complementary (Golay) sequences in at least the EDMG-CEF and the shifted EDMG-CEF may depend on a width of the channel bonding (e.g., the CB may determine the sequence length). For example, for CB2, lengths of 256 may be used, for CB4, lengths of 512 may be used, while for CB3 lengths of 384 (3×128) may be used.

As noted above, in some cases, the wideband preamble portion may be sent as a single carrier signal (and used for time synchronization), while subsequent data payload may be sent using different modulations.

Figure 4A:
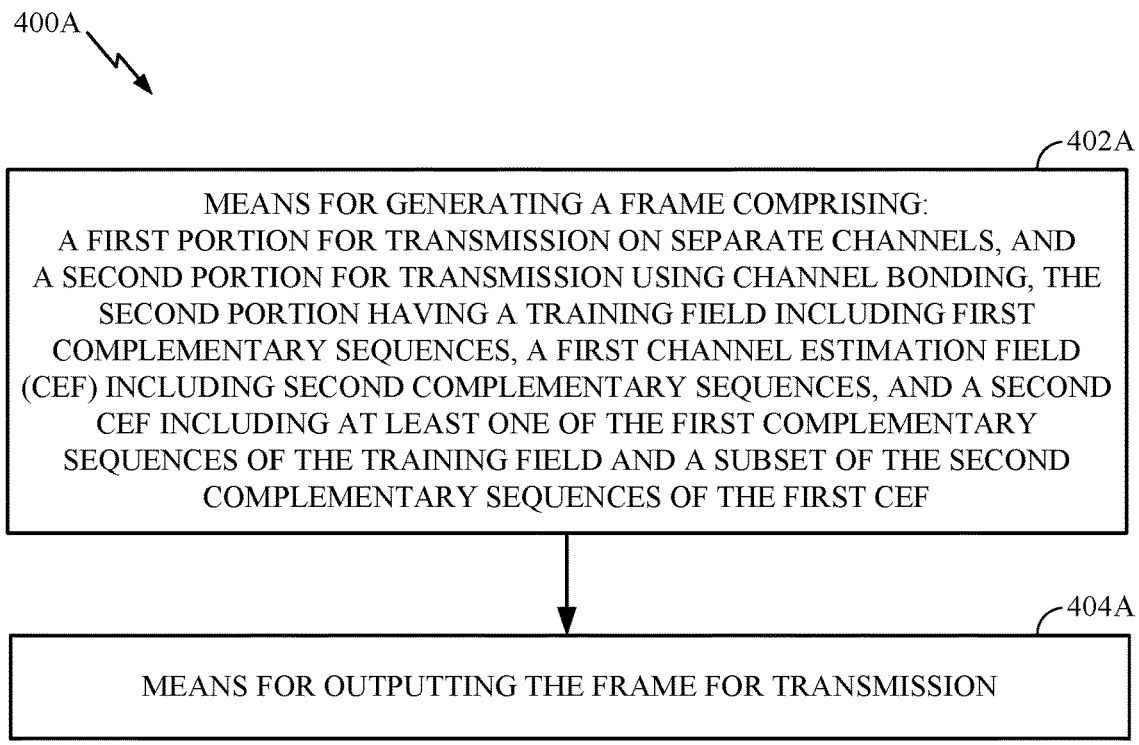
FIG. 4A illustrates example components capable of performing the operations of FIG. 4.
Figure 5A:
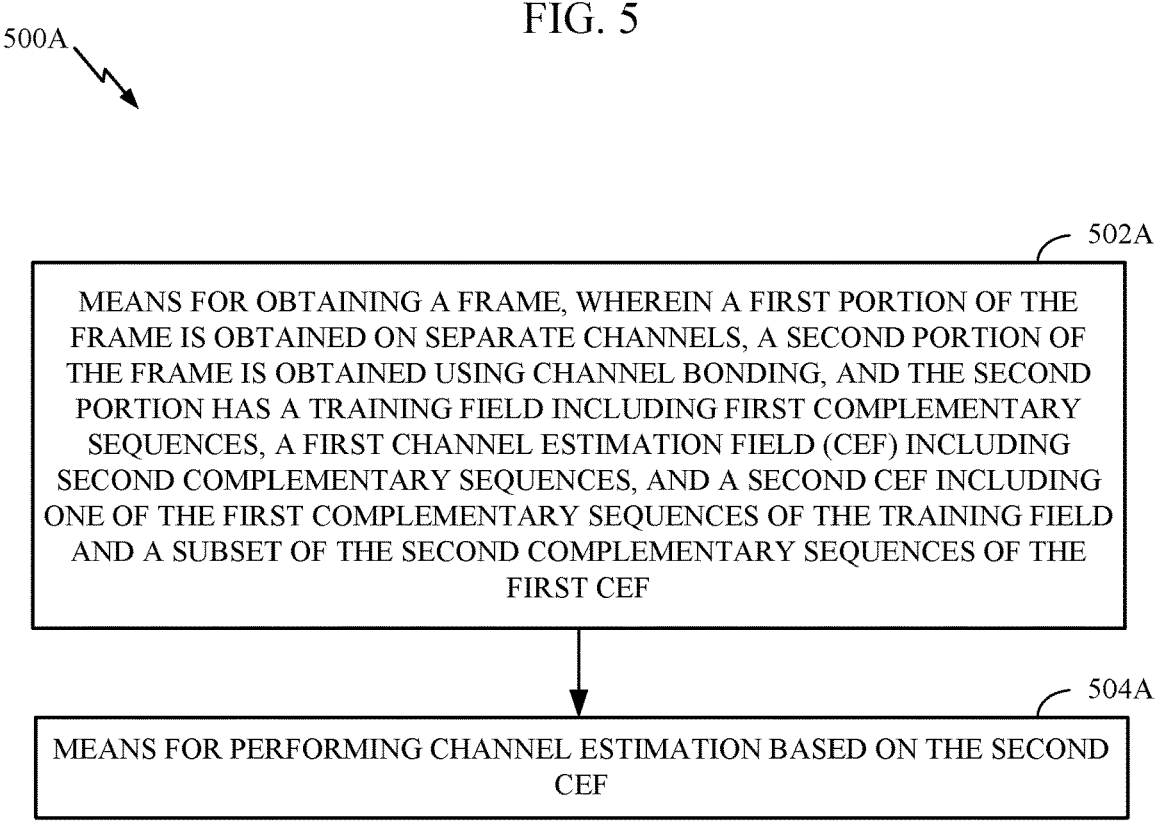
FIG. 5A illustrates example components capable of performing the operations of FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 and 500 illustrated in FIGS. 4 and 5 correspond to means 400A and 500A illustrated in FIGS. 4A and 5A.

For example, means for receiving, means for obtaining, and means for communicating may be a receiver (e.g., the receiver unit of transceiver 254) and/or an antenna(s) 252 of the user terminal 120 illustrated in FIG. 2, or the receiver (e.g., the receiver unit of transceiver 222) and/or antenna(s) 224 of access point 110 illustrated in FIG. 2. Means for transmitting may be a transmitter (e.g., the transmitter unit of transceiver 254) and/or an antenna(s) 252 of the user terminal 120 illustrated in FIG. 2, or the transmitter (e.g., the transmitter unit of transceiver 222) and/or antenna(s) 224 of access point 110 illustrated in FIG. 2. Means for outputting may also be a transmitter or may be a bus interface, for example, to output a frame from a processor to an RF front end for transmission. Means for generating a frame, means for performing channel estimation, means for determining, and/or means for deciding may be implemented using one or more of the processors described above, for example, with reference to FIG. 2.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to generate a frame comprising:
a first portion for transmission on separate channels; and
a second portion for transmission using channel bonding, wherein:
the second portion includes:
a training field including first complementary sequences;
a first channel estimation field (CEF) including second complementary sequences; and
a shifted CEF, different from the first CEF, including one of the first complementary sequences of the training field and a subset of the second complementary sequences of the first CEF, wherein the shifted CEF is at least partially included within the training field; and
an interface for outputting the frame for transmission.

2. The apparatus of claim 1, wherein a last of the first complementary sequences of the training field is a same as a last of the second complementary sequences of the first CEF, both forming a cyclic pattern.

3. The apparatus of claim 2, wherein a second to the last of the first complementary sequences of the training field is a same as a last of the subset of the second complementary sequences of the shifted CEF, both forming a cyclic pattern.

4. The apparatus of claim 1, wherein the second portion of the frame is output for transmission as a single carrier (SC) transmission using the channel bonding.

5. The apparatus of claim 1, wherein the second portion of the frame is output for transmission as an orthogonal frequency division multiplexing (OFDM) transmission with the channel bonding.

6. The apparatus of claim 1, wherein the first complementary sequences of the training field and the second complementary sequences of the first CEF comprise Golay code sequences.

7. The apparatus of claim 1, wherein:
the one of the first complementary sequences included in the shifted CEF comprises a last complementary sequence of the training field; and
the last complementary sequence of the training field comprises a Ga Golay code sequence.

8. The apparatus of claim 1, wherein the processing system is configured to determine lengths of at least one of the first or second complementary sequences based on a width of the channel bonding.

9. The apparatus of claim 1, wherein the shifted CEF at least partially overlaps the training field in time.

10. A wireless station, comprising:
at least one antenna;
a processing system configured to generate a frame comprising:
a first portion for transmission on separate channels; and
a second portion for transmission using channel bonding, wherein:
the second portion includes:
a training field including first complementary sequences;
a first channel estimation field (CEF) including second complementary sequences; and
a shifted CEF, different from the first CEF, including one of the first complementary sequences of the training field and a subset of the second complementary sequences of the first CEF, wherein the shifted CEF is at least partially included within the training field; and
a transmitter configured to transmit the frame via the at least one antenna.

11. An apparatus for wireless communications, comprising:
an interface configured to obtain a frame, wherein:
a first portion of the frame is obtained on separate channels, a second portion of the frame is obtained using channel bonding and
the second portion includes:
a training field including first complementary sequences;
a first channel estimation field (CEF) including second complementary sequences; and
a shifted CEF, different from the first CEF, including one of the first complementary sequences of the training field and a subset of the second complementary sequences of the first CEF, wherein the shifted CEF is at least partially included within the training field; and
a processing system configured to perform channel estimation based on at least one of the first CEF or the second CEF.

12. The apparatus of claim 11, wherein the processing system is further configured to determine whether to base the channel estimation on the shifted CEF or the first CEF, based on one or more conditions.

13. The apparatus of claim 12, wherein the one or more conditions relate to at least one of available processing resources of the apparatus or latency requirements.

14. The apparatus of claim 13, wherein:
the latency requirements call for the apparatus to generate a response to the frame within a time period after obtaining the frame; and
the processing system is configured to
determine the channel estimation is to be based on the shifted CEF if the time period is less than or equal to a threshold value; or
determine the channel estimation is to be based on the first CEF if the time period is greater than the threshold value.

15. The apparatus of claim 11, further comprising at least one antenna via which the frame is received, wherein the apparatus is configured as a wireless station.

\* \* \* \* \*